(12) United States Patent
Chang et al.

(10) Patent No.: US 12,215,193 B2
(45) Date of Patent: Feb. 4, 2025

(54) BIONYLON HAVING TRIPLE SHAPE MEMORY PROPERTIES, AND PREPARATION METHOD THEREFOR

(71) Applicant: INDUSTRY-UNIVERSITY COOPERATION FOUNDATION HANYANG UNIVERSITY ERICA CAMPUS, Ansan-Si (KR)

(72) Inventors: Youngwook Chang, Yongin-si (KR); Joowan Ha, Busan (KR); Myungchan Choi, Ansan-si (KR); Muhammad Kashif, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 988 days.

(21) Appl. No.: 17/593,351

(22) PCT Filed: Jun. 17, 2016

(86) PCT No.: PCT/KR2016/006478
§ 371 (c)(1),
(2) Date: Oct. 29, 2021

(87) PCT Pub. No.: WO2017/039127
PCT Pub. Date: Mar. 9, 2017

(65) Prior Publication Data
US 2022/0204692 A1    Jun. 30, 2022

(30) Foreign Application Priority Data
Aug. 31, 2015  (KR) .................. 10-2015-0122897

(51) Int. Cl.
*C08G 69/10* (2006.01)
*B29C 61/06* (2006.01)
(Continued)

(52) U.S. Cl.
CPC .............. *C08G 69/10* (2013.01); *B29C 61/06* (2013.01); *C08G 69/04* (2013.01);
(Continued)

(58) Field of Classification Search
CPC ...... C08G 69/10; C08G 69/265; C08G 69/28; C08G 69/04; B29C 61/06; B29K 2077/00;
(Continued)

(56) References Cited

U.S. PATENT DOCUMENTS

2002/0161163 A1   10/2002   Isobe et al.
2011/0105683 A1   5/2011    Kato et al.

FOREIGN PATENT DOCUMENTS

CN    103030803 A       4/2013
CN    104193989 A   *  12/2014
(Continued)

OTHER PUBLICATIONS

CN 104193989 English language translation (Year: 2014).*
(Continued)

*Primary Examiner* — Shane Fang
(74) *Attorney, Agent, or Firm* — Finch & Maloney PLLC

(57) ABSTRACT

A method for preparing a bionylon having triple shape memory effects comprises generating amino acid containing a biomass-derived pyrrolidone group using itaconic acid and a diamine; and generating a nylon copolymer by reacting the amino acid containing the pyrrolidone group and an α,ω-aliphatic amino acid. The prepared bionylon has triple shape memory effects and is capable of shape deformation, fixing and recovery through two steps. Shape recovery temperature can be adjusted to a desired level by controlling the content of a reactant.

7 Claims, 4 Drawing Sheets

(51) Int. Cl.
  *B29K 77/00*      (2006.01)
  *B29K 105/00*     (2006.01)
  *C08G 69/04*      (2006.01)

(52) U.S. Cl.
  CPC .. *B29K 2077/00* (2013.01); *B29K 2105/0085* (2013.01); *B29K 2995/0056* (2013.01)

(58) Field of Classification Search
  CPC .... B29K 2105/0085; B29K 2995/0056; B29K 2995/0026
  See application file for complete search history.

(56) References Cited

FOREIGN PATENT DOCUMENTS

| | | | | |
|---|---|---|---|---|
| JP | 2012107122 | * | 6/2012 | ............. C08G 69/28 |
| KR | 10-2020-014054 A | | 2/2002 | |

OTHER PUBLICATIONS

Wang et al., "Synthesis of fully bio-based polyamides with tunable properties by employing itaconic acid", Polymer vol. 55, pp. 4846-4856 (2014).

Ha et al., "Synthesis and characterization of fully bio-based copolyamides derived from 11-aminoundecanoic acid, 1,10-decanediamine and itaconic acid", Collected abstracts of research papers of The Polymer Society of Korea Conference, The Polymer Society of Korea, 3PS-90, vol. 40, No. 1, p. 124 (Apr. 2015).

* cited by examiner

[Fig. 1]
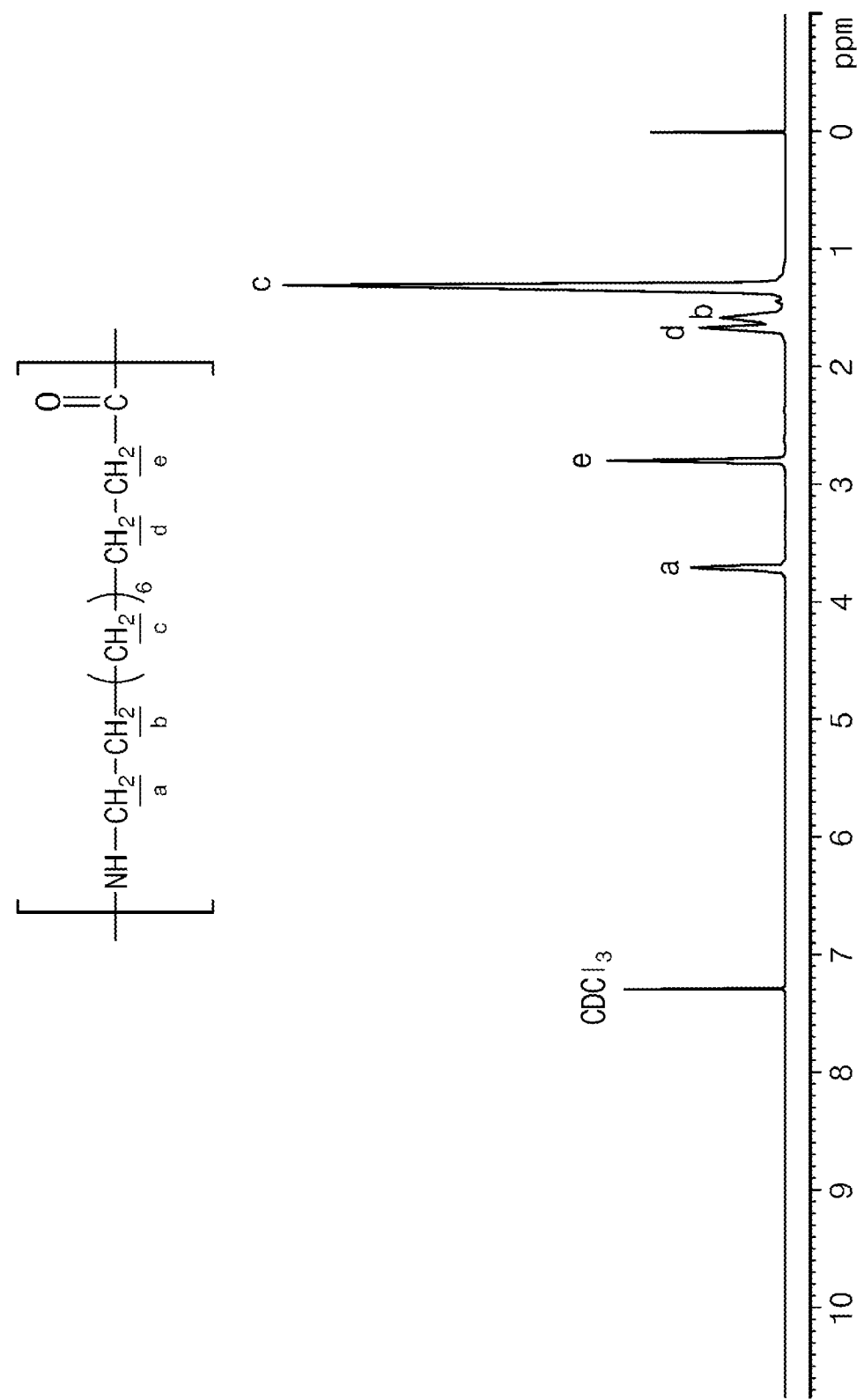

[Fig. 2]
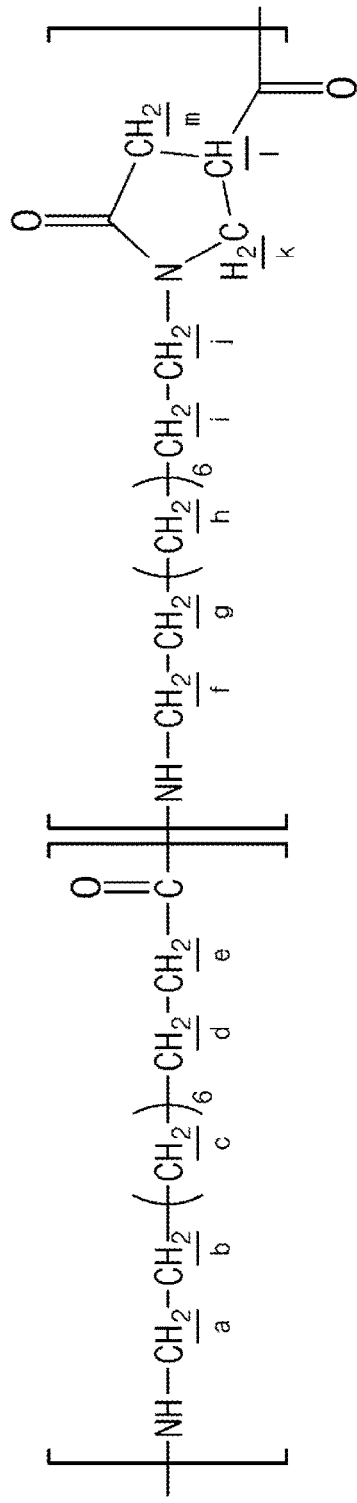
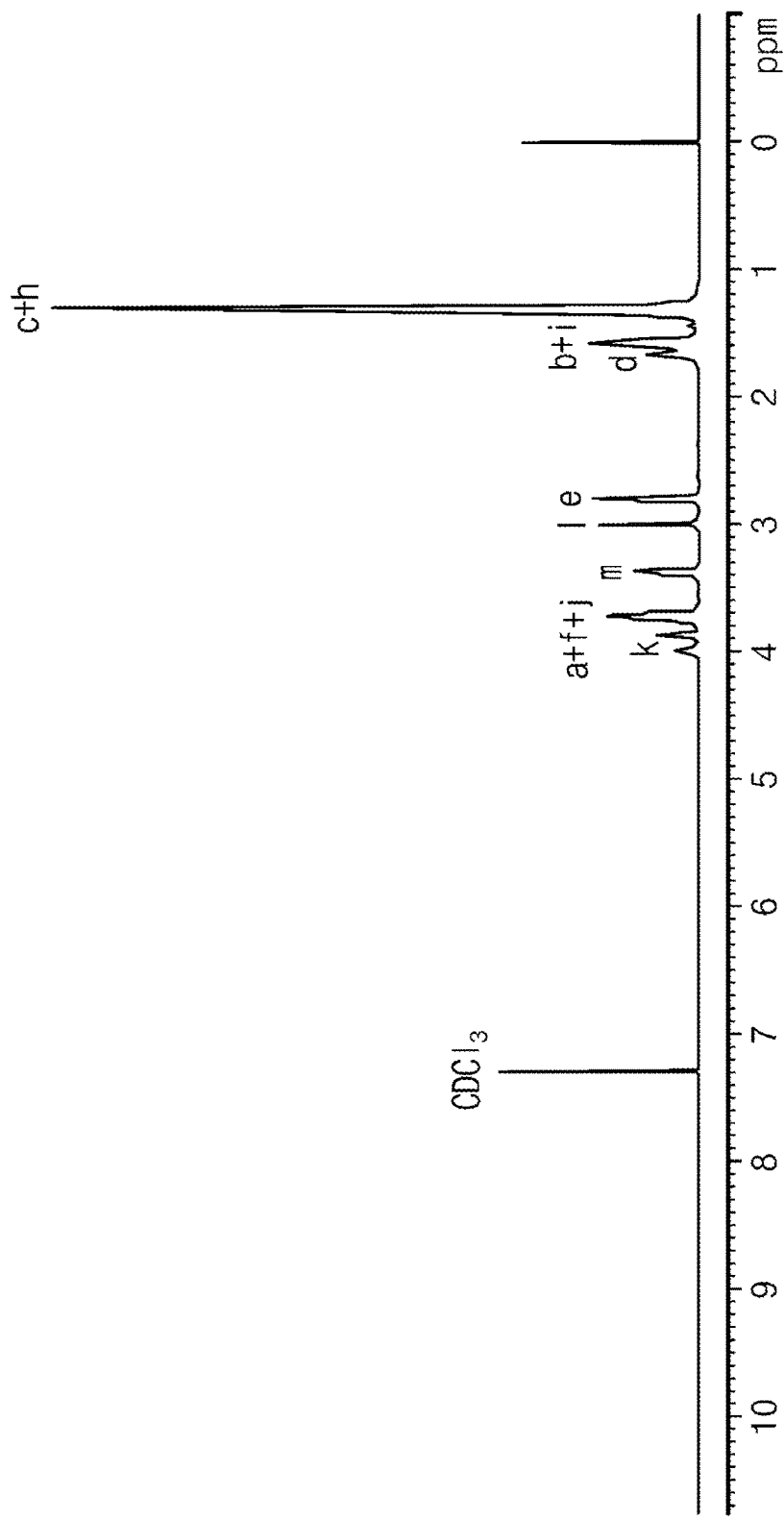

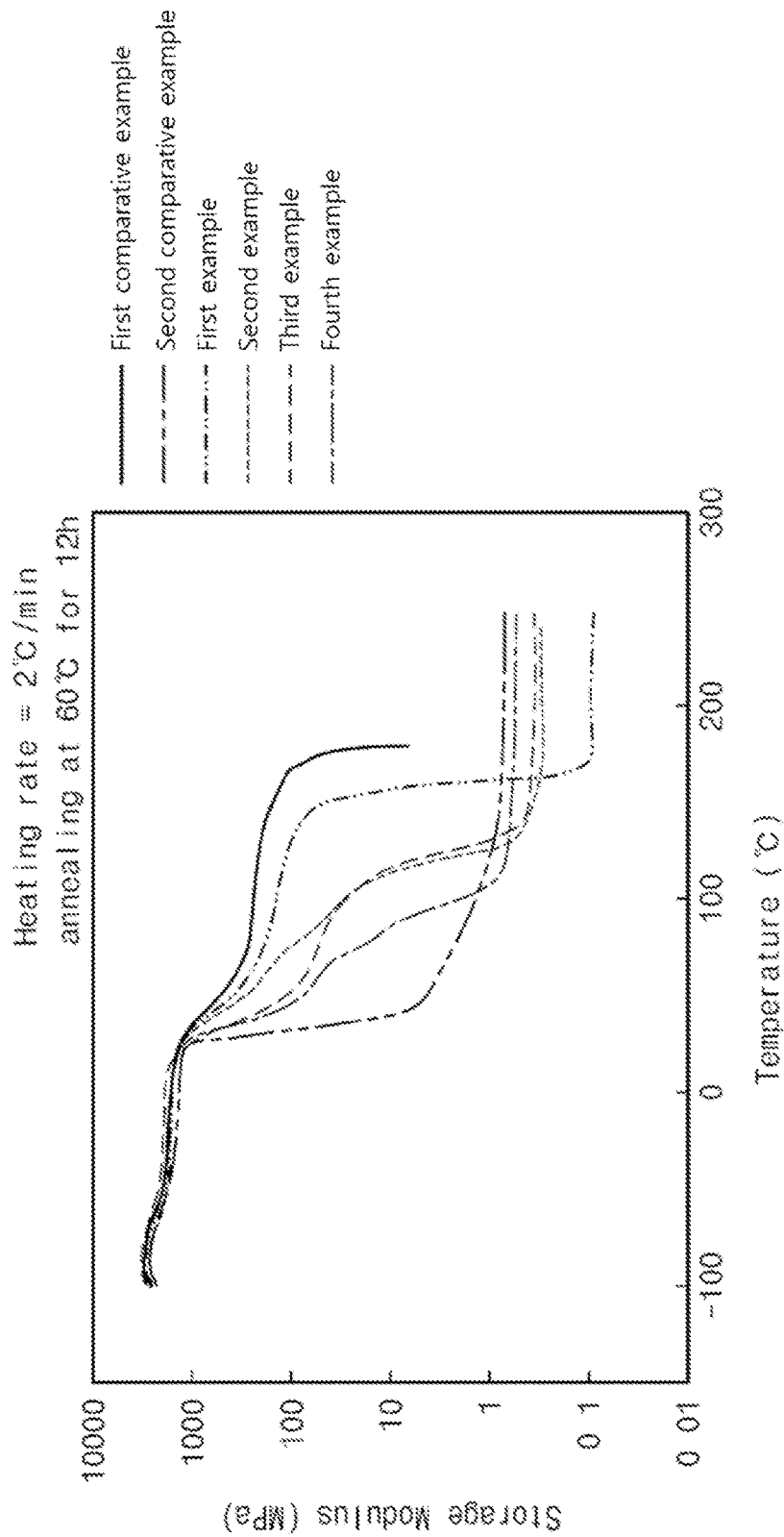
[Fig. 3]

[Fig. 4]
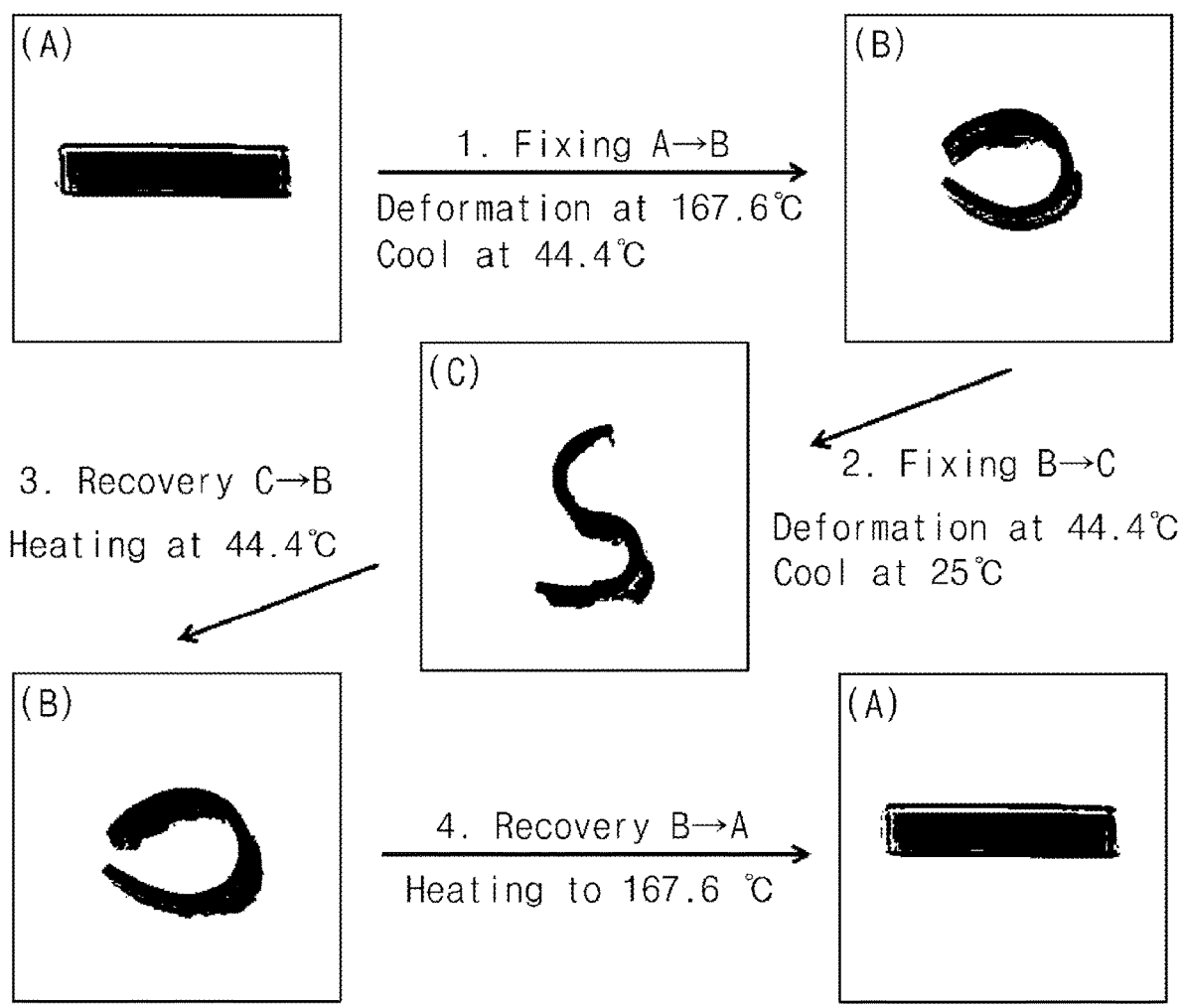

BIONYLON HAVING TRIPLE SHAPE MEMORY PROPERTIES, AND PREPARATION METHOD THEREFOR

BACKGROUND OF THE INVENTION

1. Field of the Invention

The present invention relates to a bionylon having triple shape memory effects and a method for preparing the same and, more particularly, to a bionylon having triple shape memory effects, which includes a nylon copolymer prepared by condensation polymerization of amino acid containing a biomass-derived pyrrolidone group and α, ω-aliphatic amino acid.

2. Description of the Prior Art

Currently, one of the most widely used shape memory materials is a shape memory alloy, but it has disadvantages such as a low strain rate, high costs, difficulty in processing, and difficulty in controlling a transition temperature. In contrast, a shape memory polymer has advantages of a high strain rate, low costs, a low density, easy control of a transition temperature, ease of processing, and potential biocompatibility and biodegradability.

The existing shape memory polymer may have a specific temporary shape and is a dual shape memory polymer that remembers only one original shape in one step.

A biopolymer, which may be prepared from renewable resources such as natural products, has a very large effect of reducing carbon dioxide compared to a conventional petroleum-based polymer and is an eco-friendly material capable of coping with resource depletion, and thus is being actively studied in recent years. Although bio-based nylon resins such as PA11, PA1010, etc., have been developed, a material with functionality such as shape memory effects has not yet been developed.

With a growing demand for the conversion of polymer materials obtained from fuel oil and petrochemical-based petroleum resources into biomass-based materials from the point of view of global environmental protection, study has been conducted on a method for preparing a bio-based polymer which is harmless to the environment and is a renewable raw material.

In particular, research has been conducted on a method for preparing a bio-based shape memory polymer which is eco-friendly and may be more economically mass produced by preparing a shape memory polymer, which is a smart material capable of actively responding to changes in external environmental conditions.

For example, Korean Unexamined Patent Publication No. 10-2002-0014054 (applicant: Ulsan Institute of Technology as an educational foundation) discloses technology on a method for preparing and using a shape memory resin composition, in which a first component of a polyaliphatic ester-polyamide block copolymer is mixed with a second component of a polymer having compatibility with polyaliphatic ester so as to prepare a uniformly mixed phase, after which a molded body deformed by a physical external force is formed by setting a glass transition temperature of the uniformly mixed phase to a shape recovery reference temperature, and then is heated at a glass transition temperature or higher, thereby recovering an original shape before deformation.

There have been ongoing studies on a shape memory polymer capable of fixing and recovering a shape, and there is a need for research and development to prepare a shape memory polymer which may be more economically mass-produced and is capable of easily controlling a shape recovery temperature to a desired level.

SUMMARY OF THE INVENTION

One technical object of the present invention is to provide a bionylon having triple shape memory effects and a method for preparing the same.

Another technical object of the present invention is to provide an eco-friendly and renewable bio-based bionylon having triple shape memory effects and a method for preparing the same.

Still another technical object of the present invention is to provide a bionylon having triple shape memory effects, capable of easily controlling a shape recovery temperature, and a method for preparing the same.

Still another technical object of the present invention is to provide a bionylon having triple shape memory effects, which may be mass-produced, and a method for manufacturing the same.

Still another technical object of the present invention is to provide a bionylon having triple shape memory effects with a simplified preparation process and a method for preparing the same.

Still another technical object of the present invention is to provide a bionylon having triple shape memory effects with reduced preparation costs and a method for preparing the same.

The technical objects of the present invention are not limited to the above.

To solve the above technical objects, the present invention may provide a method for preparing a bionylon having triple shape memory effects.

According to one embodiment, the method may include steps of generating amino acid containing a biomass-derived pyrrolidone group by reacting itaconic acid and diamine; and generating a nylon copolymer represented by [Formula 1] below by reacting the amino acid containing the biomass-derived pyrrolidone group and , ω-aliphatic amino.

[Formula 1]

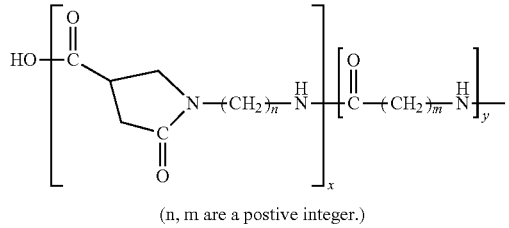

(n, m are a postive integer.)

According to one embodiment, in the method for preparing the bionylon having triple shape memory effects, the amino acid containing the biomass-derived pyrrolidone group may be generated by Michael addition reaction and amidation of the itaconic acid and the diamine.

According to one embodiment, the diamine may include 2 to 13 carbon atoms.

According to one embodiment, the nylon copolymer may be generated by condensation polymerization of the synthesized amino acid containing the biomass-derived pyrrolidone group and the α,ω-aliphatic amino acid.

According to one embodiment, the generating of the nylon copolymer may include copolymerization of the amino acid containing the biomass-derived pyrrolidone group and the α, ω-aliphatic amino acid so that a molar content of the amino acid containing the biomass-derived pyrrolidone group is 20 to 60%.

According to one embodiment, the α,ω-aliphatic amino acid may have 4, 9, 10, 11, and 12 carbon atoms.

To solve the above technical objects, the present invention may provide a bionylon having triple shape memory effects.

According to one embodiment, the bionylon having triple shape memory effects may include a nylon copolymer represented by [Formula 1] below.

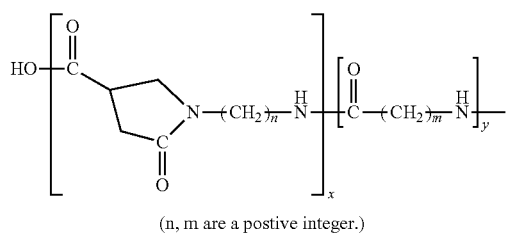

[Formula 1]

(n, m are a postive integer.)

According to one embodiment, the nylon copolymer may have both a glass transition temperature (Tg) and a melting temperature (Tm) as a phase transition temperature when a storage modulus is measured according to a temperature change, and the storage modulus may be maintained to have a constant value at the melting temperature (Tm) or higher (storage modulus).

According to one embodiment, the nylon copolymer may have a melting temperature (Tm) of 101.4 to 167.6° C., a glass transition temperature (Tg) of 38.7 to 44.4° C., and an intrinsic viscosity of 1.16 to 1.18 ml/g.

According to one embodiment, the method for using the bionylon having triple shape memory effects may include: primarily deforming the nylon copolymer having an initial shape (A) by a force applied from outside at a melting temperature (Tm) or higher; cooling down the primarily deformed nylon copolymer to a glass transition temperature (Tg); removing the force having caused the primary deformation, but maintaining a shape (B) of the primarily deformed nylon copolymer; secondarily deforming the primarily deformed nylon copolymer by a force applied from outside at the glass transition temperature (Tg); and cooling down the secondarily deformed nylon copolymer to room temperature, removing the force having caused the secondary deformation, but maintaining a shape (C) of the secondarily deformed nylon copolymer.

According to one embodiment, the method for using the bionylon having triple shape memory effects may further include: heating the secondarily deformed nylon copolymer (C) at the glass transition temperature (Tg) to recover the shape (B) of the primarily deformed nylon copolymer; and heating the primarily deformed nylon copolymer (B) at the melting temperature (Tm) or higher to recover the original shape (A) of the nylon copolymer.

To solve the above technical objects, the present invention may provide amino acid containing a biomass-derived pyrrolidone group.

According to one embodiment, the amino acid containing the biomass-derived pyrrolidone group may be prepared by Michael addition reaction and amidation of itaconic acid and diamine and may be represented by [Formula 2] below.

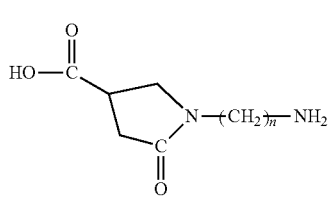

[Formula 2]

(n is a postive integer.)

According to an embodiment of the present invention, a bionylon having triple shape memory effects, capable of shape deformation, fixing and recovery through two steps, can be prepared. There may be provided a method for preparing a bionylon having triple shape memory effects, which is eco-friendly by using a bio-based reactant and is capable of controlling a shape recovery temperature to a desired level by adjusting a content of the reactant when preparing the bionylon having triple shape memory effects, and thus is applicable to a wide range of fields such as a medical field, actuators, aircrafts, automobiles, an electronic industry, etc.

BRIEF DESCRIPTION OF THE DRAWINGS

FIG. 1 is a graph showing the results of measurement with $^1$H-NMR spectroscopy to explain a chemical bonding structure of nylon11 prepared according to a first comparative example with respect to an embodiment of the present invention.

FIG. 2 is a graph showing the results of measurement with $^1$H-NMR spectroscopy to explain a chemical bonding structure of a nylon copolymer prepared from amino acid containing a biomass-derived pyrrolidone group prepared a third embodiment of the present invention in a molar content of 50%.

FIG. 3 is a graph showing the results of measurement with dynamic mechanical analysis (DMA) to explain a storage modulus of a nylon copolymer prepared by varying a molar content of amino acid containing a biomass-derived pyrrolidone group prepared according to an embodiment of the present invention.

FIG. 4 is an image for explaining the triple shape memory effects of a first embodiment out of nylon copolymers prepared according to an embodiment of the present invention.

DETAILED DESCRIPTION OF THE EXEMPLARY EMBODIMENTS

Hereinafter, preferred embodiments of the present invention will be described in detail with reference to the accompanying drawings. However, the technical idea of the present invention is not limited to the embodiments described herein and may be embodied in other forms. The embodiments introduced herein are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present specification, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added.

Further, in the following description of the present invention, a detailed description of known functions or configurations incorporated herein will be omitted when it may make the subject matter of the present invention unnecessarily unclear.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

Amino acid containing a biomass-derived pyrrolidone group and a method for preparing the same according to an embodiment of the present invention will be described.

For the preparation of the amino acid containing the biomass-derived pyrrolidone group, itaconic acid and diamine may be provided. The itaconic acid may be represented by [Formula 1] below. According to one embodiment, the itaconic acid may be a natural product-derived monomer.

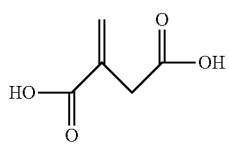

[Formula 1]

The diamine may be represented by [Formula 2] below, and may be a diamine-based monomer having 2 to 13 carbon atoms.

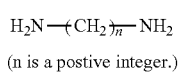

[Formula 2]

(n is a postive integer.)

For example, the diamine-based monomer may be any one of 1,2-diaminoethane, 1,3-diaminopropane, 1,4-diaminobutane, 1,5-diaminopentane, 1,6-diaminohexane, 1,8-diaminooctane, 1,10-diaminodecane, 1,12-diaminododecane, and 1,13-diaminotridecane, which have 2 to 13 carbon atoms.

Amino acid containing a biomass-derived pyrrolidone group according to an embodiment of the present invention, which is represented by [Formula 3] below, may be prepared by Michael addition reaction and amidation of the itaconic acid and the diamine. For example, 1-(10-aminodecyl)-2-pyrrolidone-4-carboxylic acid (ADPA), which is the amino acid containing the biomass-derived pyrrolidone group, may be prepared by Michael addition reaction and amidation of the itaconic acid and 1,10-diaminodecane, which is one of the diamine.

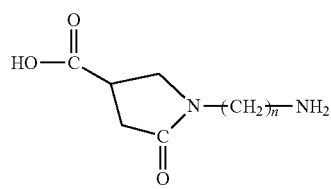

[Formula 3]

(n is a postive integer.)

Specifically, the method for preparing the amino acid containing the biomass-derived pyrrolidone group may include preparing a salt-type monomer, and heating the salt-type monomer to prepare the amino acid containing the biomass-derived pyrrolidone group.

In the preparing of the salt-type monomer, this preparation may be performed with an itaconic acid solution and a diamine solution by dissolving the itaconic acid and the diamine in a solvent, respectively. For example, the solvent may be any one of alcohols such as ethyl alcohol, methyl alcohol, etc.

In the preparing of the salt-type monomer, a heating process may be performed in such a way that the prepared itaconic acid solution and the diamine solution are added and mixed in a reaction vessel and heat is applied thereto. The salt-type monomer including the itaconic acid and the diamine, represented by [Formula 4] below, may be prepared by the above process.

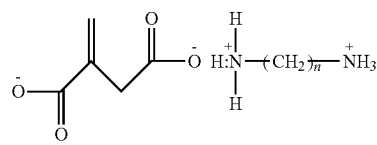

[Formula 4]

(n is a postive integer.)

A heating process in which heat is applied to the salt-type monomer may be performed, and thus Michael addition reaction may be performed. Accordingly, an intermediate product represented by [Formula 5] below may be prepared. With respect to a form of a heater used in the heating process, a type thereof is not particularly limited. For example, the heater may be any one of a heater, a hot plate, or a heating coil.

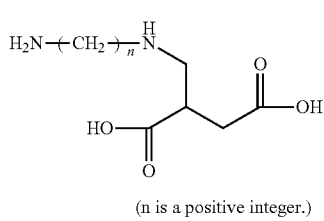

[Formula 5]

(n is a positive integer.)

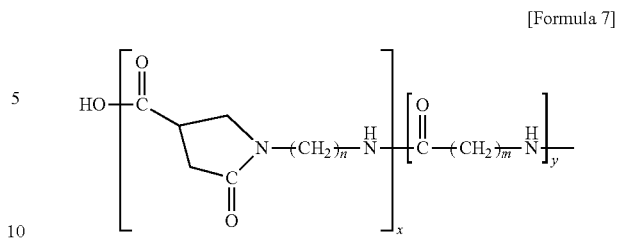

[Formula 7]

The intermediate product represented by above [Formula 5] may be heated to prepare the amino acid containing the biomass-derived pyrrolidone group represented by above [Formula 3]. For example, the intermediate product may be heated at 240° C.

A bionylon having triple shape memory effects using the amino acid containing the biomass-derived pyrrolidone group and a method for preparing the same according to the embodiment of the present invention described above will be described.

An amino acid containing a biomass-derived pyrrolidone group according to an embodiment of the present invention and α,ω-aliphatic amino acid may be provided. For example, 1-(10-aminodecyl)-2-pyrrolidone-4-carboxylic acid (ADPA) and α,ω-aliphatic amino acid may be provided.

The α,ω-aliphatic amino acid may be represented by [Formula 6] below, and may be an α,ω-aliphatic amino acid having 4, 9, 10, 11, or 12 carbon atoms.

According to one embodiment, the α,ω-aliphatic amino acid may be commercially available.

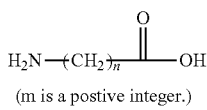

[Formula 6]

(m is a postive integer.)

For example, the α,ω-aliphatic amino acid may be any one of 1,4-aminobutanoic acid, 1,9-aminononanoic acid, 1,10-aminodecanoic acid, 1,11-aminoundecanoic acid, and 1,12-aminododecanoic acid.

A nylon copolymer may be prepared by condensation polymerization reaction of the amino acid containing the biomass-derived pyrrolidone group and the α,ω-aliphatic amino acid. A nylon copolymer represented by [Formula 7] below may be prepared by condensation polymerization reaction of the amino acid containing the biomass-derived pyrrolidone group represented by above [Formula 3] and the α,ω-aliphatic amino acid represent by above [Formula 6]. x represented by [Formula 7] below may be the number of the amino acids containing the biomass-derived pyrrolidone group involved in the condensation polymerization reaction, and y may be the number of the α,ω-aliphatic amino acids involved in the condensation polymerization reaction. In addition, n, m, x, and y represented by [Formula 7] below may be positive integers.

The condensation polymerization reaction may be an amidation between an amine group (—NH$_2$) and carboxyl acid (—COOH) of the amino acid containing the biomass-derived pyrrolidone group, and carboxylic acid (—COOH) and an amine group (—NH$_2$) of the α,ω-aliphatic amino acid, from which a water molecule (H$_2$O) is generated and discharged, thereby preparing the nylon copolymer having an amide bond.

The method for preparing the nylon copolymer may include a heating process and a stirring process of a reactant.

A heating process may be performed in such a way that the amino acid containing the biomass-derived pyrrolidone group and the α,ω-aliphatic amino acid may be added into a reaction vessel as the reactant, and heat is applied to the reaction vessel under a nitrogen (N$_2$) atmosphere. With respect to a form of a heater used in the heating process, a type thereof is not particularly limited. For example, the heater may be any one of a heater, a hot plate, or a heating coil. In addition, the heating process for the reaction vessel may be performed at 240° C. for two hours. Furthermore, the reaction in the reaction vessel may further include a stirring process. For example, a stirring speed in the stirring process may be 160 rpm. With the heating process and the stirring process, the condensation polymerization reaction of the amino acid containing the biomass-derived pyrrolidone group and the α,ω-aliphatic amino acid may be performed to prepare the nylon copolymer.

The nylon copolymer may have two phase transition temperatures (a glass transition temperature (Tg) and a melting temperature (Tm)). Based on the two phase transition temperatures (the glass transition temperature (Tg) and the melting temperature (Tm)), the nylon copolymer may have a glass state section at the glass transition temperature (Tg) or lower, a rubbery state section between the glass transition temperature (Tg) and the melting temperature (Tm), and a melt state section at the melting temperature (Tm) or higher, in which a storage modulus is drastically changed and the storage modulus is constantly maintained in the melt state section at the melting temperature or higher. The nylon copolymer may be prepared by condensation polymerization reaction between the amino acid containing the biomass-derived pyrrolidone group in a molar content of 20% to 60% and the α,ω-aliphatic amino acid in a molar content of 80% to 40%. Accordingly, the nylon copolymer (nylon copolymer) may have a shape fixed, deformed and recovered through two steps based on the two phase transition temperatures (glass transition temperature (Tg) and melting temperature (Tm)), thereby providing triple shape memory effects.

If a molar content of the amino acid containing the biomass-derived pyrrolidone group is less than 20%, there may be no storage modulus in the melt state section at the melting temperature (Tm) or higher, and if a molar content of amino acid containing the biomass-derived pyrrolidone group is more than 60%, there may be no melting point (Tm), thereby failing to provide two phase transition temperatures (glass transition temperature (Tg) and melting point (Tm)), such that two steps of shape deformation and fixing may not be easy. Accordingly, if a molar content of the amino acid containing the biomass-derived pyrrolidone group is less than 20% and if a molar content of the amino acid containing the biomass-derived pyrrolidone group is more than 60%, it may not be easy to prepare a bionylon with triple shape memory effects.

The nylon copolymer prepared according to the embodiment of the present invention described above may have a melting temperature (Tm) of 101.4 to 167.6° C., a glass transition temperature (Tg) of 37.4 to 44.4° C., and an intrinsic viscosity of 1.16 to 1.18 ml/g.

Hereinafter, a method for using a nylon copolymer having triple shape memory effects according to the embodiment of the present invention described above will be described.

An initial shape (A) of the nylon copolymer may be primarily deformed by a force applied from outside at a melting temperature (Tm) or higher. The primarily deformed nylon copolymer may maintain a shape (B) of the primarily deformed nylon copolymer as it is even after cooling down to the glass transition temperature (Tg) and removing the force having caused the primary deformation. The primarily deformed nylon copolymer may be secondarily deformed by the force applied from outside around the glass transition temperature (Tg). The secondarily deformed nylon copolymer may maintain a shape (B) of the secondarily deformed nylon copolymer even after cooling down to room temperature and removing the force having caused the secondary deformation. In addition, when the secondarily deformed nylon copolymer is heated again to the glass transition temperature (Tg), and the shape (B) of the primarily deformed nylon copolymer may be recovered. In addition, when the primarily deformed nylon copolymer is heated again to the melting temperature (Tm), and the initial shape (A) of the nylon copolymer may be restored to a state just before the primary deformation occurs. Accordingly, the nylon copolymer prepared according to an embodiment of the present invention may have triple shape memory effects as the nylon copolymer is capable of shape deformation, fixing and recovery through the two steps. A shape recovery temperature may be easily controlled by adjusting a molar content of the amino acid containing the biomass-derived pyrrolidone group, which is used when preparing the nylon copolymer.

Unlike the embodiment of the present invention described above, an existing shape memory polymer has dual shape memory effects, in which an initial permanent shape is memorized, temporarily deformed by an appropriate stimulus, and then restored to an original initial shape. The dual shape memory polymer is not easy to control a shape recovery temperature to a desired level, and thus there is a limit to the application in a wide range of fields.

However, as described above, in the case of a nylon copolymer having triple shape memory effects prepared according to an embodiment of the present invention, a shape may be deformed, fixed, and recovered through two steps, thereby remembering a triple shape, and also a shape recovery temperature may be easily controlled to a desired level by adjusting a content of a reactant. In addition, a bionylon having triple shape memory effects may be prepared by using a bio-based reactant, and thus may be applied in a wide range of fields such as aircraft, environment, medical field, etc., in addition to an electronics industry.

Hereinafter, the results of evaluating properties of the nylon copolymer prepared according to the embodiment of the present invention described above will be described.

In order to prepare a nylon copolymer according to an embodiment of the present invention, an itaconic acid solution and a diamine solution were prepared by dissolving itaconic acid and 1,10-diaminodecane, which is one of diamine-based monomers, in a solvent of ethanol, respectively. The itaconic acid solution and the 1,10-diaminodecane were added into a beaker at the same mol ratio and reacted at 60° C. for 30 minutes. The product generated by the reaction was dried in a vacuum oven at 50° C. for 12 hours to obtain a salt-type monomer, which was then subjected to a heating process, thereby preparing 1-(10-aminodecyl)-2-pyrrolidone-4-carboxylic acid (ADPA), which is the amino acid containing the biomass-derived pyrrolidone group. The 1-(10-aminodecyl)-2-pyrrolidone-4-carboxylic acid (ADPA), which is the amino acid containing the biomass-derived pyrrolidone group, and 11-aminoundecanoic acid (AUA), which is the α,ω-aliphatic amino acid, were added into a 250 ml reaction vessel by varying a mol ratio thereof, and reacted at 240° C. for two hours under a nitrogen ($N_2$) atmosphere so as to prepare the nylon copolymer. The reaction was accompanied by stirring at a speed of 160 rpm. The mol ratio conditions of the ADPA and the AUA are shown in [Table 1] below.

TABLE 1

| Classification | ADPA:AUA mol ratio |
|---|---|
| First Comparative Example | 0:1 |
| First Example | 2:8 |
| Second Example | 4:6 |
| Third Example | 5:5 |
| Fourth Example | 6:4 |
| Second Comparative Example | 8:2 |

FIGS. 1 and 2 are graphs showing the results of measurement with $^1$H-NMR spectroscopy to explain a chemical bonding structure of a nylon copolymer prepared from an amino acid containing a biomass-derived pyrrolidone group prepared according to a third example (ADPA:AUA=5:5) of the present invention by varying a molar content as well as a first comparative example (ADPA:AUA=0:1) with respect to embodiments of the present invention.

Referring to FIG. 1, a chemical bonding structure of nylon11 polymerized with 11-aminoundecanoic acid (AUA), which is an α,ω-aliphatic amino acid, was confirmed from the $^1$H-NMR graph.

As can be understood from FIG. 2, a chemical bonding structure of a nylon copolymer polymerized with 1-(10-aminodecyl)-2-pyrrolidone-4-carboxylic acid (ADPA), which is the amino acid containing the biomass-derived pyrrolidone group, and 11-aminoundecanoic acid (AUA), which is an α,ω-aliphatic amino acid, was confirmed from the $^1$H-NMR graph.

From the results of FIGS. 1 and 2, it was confirmed that a structure of the pyrrolidone group in the nylon copolymer is clearly synthesized.

With respect to the nylon copolymer prepared by varying a mol ratio of the ADPA and the AUA, the phase transition temperature (glass transition temperature (Tg) and melting temperature (Tm)) of the nylon copolymer was measured at a heating rate of 10° C./min by using a differential scanning calorimetry (DSC) device. The measured values of the phase transition temperature (glass transition temperature (Tg) and melting temperature (Tm)) of the nylon copolymer prepared by varying the mol ratio of the ADPA and the AUA are shown in [Table 2] below.

TABLE 2

| Classification | ADPA:AUA mol ratio | Tm (° C.) | Tg (° C.) |
|---|---|---|---|
| First Comparative Example | 0:1 | 188.4 | 45.3 |
| First Example | 2:8 | 167.6 | 44.4 |
| Second Example | 4:6 | 135.5 | 44.0 |
| Third Example | 5:5 | 134.9 | 40.6 |
| Fourth Example | 6:4 | 101.4 | 38.7 |
| Second Example | 8:2 | — | 37.4 |

[Table 2] shows the measurement results according to the first comparative example (ADPA:AUA=0:1), the second comparative example (ADPA:AUA=8:2), the first example (ADPA:AUA=2:8), the second example (ADPA:AUA=4:6), the third example (ADPA:AUA=5:5) and the fourth example (ADPA:AUA=6:4).

As can be understood from [Table 2], it was confirmed that the nylon copolymer prepared according to the first example (ADPA:AUA=2:8), the second example (ADPA:AUA=4:6), the third example (ADPA:AUA=5:5) and the fourth example (ADPA:AUA=6:4), in which a molar content of the amino acid containing the biomass-derived pyrrolidone group is 20% to 60%, have both phase transition temperatures (glass transition temperature (Tg) and melting temperature (Tm)). As such, in the case of having two phase transition temperatures, a phase may be fixed, deformed and recovered through two steps based on the two phase transition temperatures. In addition, as a molar content of the amino acid containing the biomass-derived pyrrolidone group increases, it was confirmed that the glass transition temperature (Tg) and the melting temperature (Tm) of the prepared nylon copolymer are different. Accordingly, it was confirmed that it is possible to prepare the nylon copolymer having triple shape memory effects, which may easily control a shape recovery temperature by adjusting a molar content of the amino acid containing the biomass-derived pyrrolidone group.

FIG. 3 is a graph showing the results of measurement with dynamic mechanical analysis (DMA) to explain a storage modulus of a nylon copolymer prepared by varying a molar content of amino acid containing a biomass-derived pyrrolidone group prepared according to an embodiment of the present invention.

Referring to FIG. 3, the nylon copolymer was prepared by the same method as described above by varying a molar content of 1-(10-aminodecyl)-2-pyrrolidone-4-carboxylic acid (ADPA), which is an amino acid containing a biomass-derived pyrrolidone group, prepared according to an embodiment of the present invention, and 11-aminoundecanoic acid (AUA), which is an α,ω-aliphatic amino acid. The mol ratio conditions of the ADPA and the AUA are as shown in above <Table 1>.

With respect to the nylon copolymer prepared by varying a mol ratio of the ADPA and the AUA, a storage modulus according to a temperature change was measured at a heating rate of 10° C./min with respect to the nylon copolymer prepared by using a dynamic mechanical analysis (DMA) device. The measured values of the storage modulus of the nylon copolymer prepared by varying a mol ratio of the ADPA and the AUA are as shown in [Table 3] below.

TABLE 3

| Classification | ADPA:AUA mol ratio | E' at 30° C. (MPa) | E' at 50° C. (MPa) | E' at 150° C. (MPa) |
|---|---|---|---|---|
| First Comparative Example | 0:1 | 1200 | 530 | 160 |
| First Example | 2:8 | 1180 | 400 | 27 |
| Second Example | 4:6 | 1400 | 500 | 0.4 |
| Third Example | 5:5 | 750 | 120 | 0.4 |
| Fourth Example | 6:4 | 830 | 80 | 0.6 |
| Second Comparative Example | 8:2 | 280 | 5 | 0.7 |

FIG. 3 shows the measurement results of storage modulus according to the first comparative example (ADPA:AUA=0:1), the second comparative example (ADPA:AUA=8:2), the first example (ADPA:AUA=2:8), the second example (ADPA:AUA=4:6), the third example (ADPA:AUA=5:5) and the fourth example (ADPA:AUA=6:4).

Referring to FIG. 3, in the case of the nylon copolymer prepared according to the first example (ADPA:AUA=2:8), the second example (ADPA:AUA=4:6), the third example (ADPA:AUA=5:5) and the fourth example (ADPA:AUA=6:4), in which a molar content of the amino acid containing the biomass-derived pyrrolidone group is 20% to 60%, it was confirmed that based on the two phase transition temperatures (the glass transition temperature (Tg) and the melting temperature (Tm)), the nylon copolymer may have a glass state section at the glass transition temperature (Tg) or lower, a rubbery state section between the glass transition temperature (Tg) and the melting temperature (Tm), and a melt state section at the melting temperature (Tm) or higher, in which a storage modulus is drastically changed and the storage modulus is constantly maintained in the melt state section at the melting temperature or higher. Accordingly, it could be understood that a shape may be fixed, deformed and recovered through two steps based on the two phase transition temperatures. Accordingly, it was confirmed that it is possible to prepare the nylon copolymer having triple shape memory effects, which may easily control a shape recovery temperature by adjusting a molar content of the amino acid containing the biomass-derived pyrrolidone group.

In contrast, in the case of the nylon prepared according to the first comparative example (ADPA:AUA=0:1) in which a molar content of the amino acid containing the biomass-derived pyrrolidone group is less than 20%, it was confirmed that there are a melting temperature (Tm) and a glass transition temperature (Tg), but there is no storage modulus in a melt state section at the melt temperature (Tm) or higher. Accordingly, if a molar content of the amino acid containing the biomass-derived pyrrolidone group is less than 20%, it was confirmed that there is no storage modulus in the melt state section, thus failing to express the triple shape memory effects. In addition, in the case of the nylon copolymer prepared according to the second comparative example, in which a molar content of the amino acid containing the biomass-derived pyrrolidone group is more than 60%, it was confirmed that there is no melting temperature (Tm). Accordingly, if a molar content of the amino acid containing the biomass-derived pyrrolidone group is more than 60%, it was confirmed that there are not two phase transition temperatures, thus failing to express the triple shape memory effects. Thus, it can be understood that using the amino acid containing the biomass-derived pyrrolidone group having a molar content of 20% to 60% is an efficient method for preparing a nylon copolymer having triple shape memory effects.

FIG. 4 shows experimental images on the triple memory properties of the first example out of the nylon copolymers prepared according to the first example (ADPA:AUA=2:8), the second example (ADPA:AUA=4:6), the third example (ADPA:AUA=5:5), and example 4 (ADPA:AUA=6:4), which are prepared by the same method as described below.

Referring to FIG. 4, it was confirmed that the nylon copolymer having a film form which is an initial shape (A) prepared according to the first example (ADPA:AUA=2:8) of the present invention maintains the primarily deformed shape (B) even after the nylon copolymer is heated at 167.6° C. or higher, which is the melting temperature (Tm) of the first example shown in above [Table 2] to apply the primary deformation, and then cooled down to around 44.4° C., which is the glass transition temperature (Tg) of the first example shown in above [Table 2], and the external force having maintaining the primary deformation is removed. Then, it was confirmed that the secondarily deformed shape (C) is maintained even after a sample is heated around 44.4° C., which is the glass transition temperature (Tg) of the first example shown in above [Table 2] to apply the secondary deformation, and then cooled down to a room temperature of 25° C., and the force having maintained the primary deformation is removed. In addition, it was confirmed that when the nylon copolymer having the secondarily deformed shape (C) is again heated around 44.4° C., which is the glass transition temperature (Tg) of the first example shown in above [Table 2], the shape is restored to the primarily deformed shape (B), and when the nylon copolymer is again heated at 167.6° C. or higher, which is the melting temperature (Tm) of the first example shown in above [Table 2], the nylon polymer is restored to have a film form, which is the initial shape (A).

As described above in the first example, it was confirmed that the nylon copolymer having a film form which is an initial shape (A) prepared according to the second example (ADPA:AUA=4:6), the third example (ADPA:AUA=5:5) and the fourth example (ADPA:AUA=6:4) of the present invention maintains the primarily deformed shape (B) even after the nylon copolymer is heated at the melting temperature (Tm) or higher of each example shown in above [Table 2] to apply the primary deformation, and then cooled down to around the glass transition temperature (Tg) of each example shown in above [Table 2], and the external force having maintaining the primary deformation is removed. Then, it was confirmed that the secondarily deformed shape (C) is maintained even after a sample is heated around the glass transition temperature (Tg) of each example shown in above [Table 2] to apply the secondary deformation, and then cooled down to a room temperature of 25° C., and the force having maintained the primary deformation is removed. In addition, it was confirmed that when the nylon copolymer having the secondarily deformed shape (C) is again heated around the glass transition temperature (Tg) of each example shown in above [Table 2], the shape is restored to the primarily deformed shape (B), and when the nylon copolymer is again heated at the melting temperature (Tm) or higher of each example shown in above [Table 2], the nylon polymer is restored to have a film form, which is the initial shape (A).

In order to evaluate the mechanical properties of the nylon copolymer prepared according to the first example (ADPA:AUA=2:8), the second example (ADPA:AUA=4:6), the third example (ADPA:AUA=5:5), and the fourth example (ADPA:AUA=6:4) of the present invention, tensile strength and tensile elongation were measured. The tensile strength (MPa) and the tensile elongation (%) were measured repeatedly five times at a strain rate of 50 mm/min at room temperature by using a universal testing machine (UTM), and then an average value thereof was calculated. The calculated values of tensile strength (MPa) and tensile elongation (%) are as shown in [Table 4] below.

TABLE 4

| Classification | ADPA:AUA mol ratio | Properties | | |
| --- | --- | --- | --- | --- |
| | | Tensile strength (MPa) | Tensile elongation (%) | 100% modulus (MPa) |
| First Example | 2:8 | 53 | 380 | 35 |
| Second Example | 4:6 | 53 | 385 | 27 |
| Third Example | 5:5 | 50 | 400 | 24 |
| Fourth Example | 6:4 | 44 | 385 | 22 |

Referring to [Table 4], it was confirmed that the nylon copolymer prepared according to the first example (ADPA:AUA=2:8), the second example (ADPA:AUA=4:6), the third example (ADPA:AUA=5:5), and the fourth example (ADPA:AUA=6:4) of the present invention has excellent mechanical properties and is capable of adjusting the values of tensile strength (MPa) and tensile elongation (%) as a molar content of amino acid containing the biomass-derived pyrrolidone group is changed. Accordingly, it was confirmed that the mechanical properties of the nylon copolymer prepared according to a molar content of the amino acid containing the biomass-derived pyrrolidone group may be easily adjustable.

A nylon copolymer having triple shape memory effects according to an embodiment of the present invention is a bio-based nylon which is eco-friendly, remembers a triple shape, and is also capable of controlling a shape recovery temperature to a desired level, and thus is applicable to a wide range of fields such as a medical field, actuators, aircrafts, automobiles, an electronic industry, etc.

What is claimed is:

1. A method for preparing a bionylon having triple shape memory effects, the method comprising:
    generating amino acid containing a biomass-derived pyrrolidone group by reacting itaconic acid and a diamine; and
    generating, through a condensation polymerization reaction, a nylon copolymer as shown in [Formula 1] below;
    wherein the condensation polymerization reaction includes providing the amino acid containing the biomass-derived pyrrolidone group and α,ω-aliphatic amino acid to a reaction chamber under a nitrogen atmosphere;
    wherein a molar content ratio of the amino acid containing the biomass-derived pyrrolidone group to the α,ω-aliphatic amino acid, provided to the reaction chamber, is from 2:8 to 6:4;
    wherein x and y are positive integers;
    wherein m=9, 11, or 12;
    wherein n=2, 3, 5, 6, 8, 12, or 13;
    wherein the nylon copolymer has both a glass transition temperature (Tg) and a melting temperature (Tm) as phase transition temperatures when a storage modulus is measured according to a temperature change; and wherein the storage modulus is maintained to have a constant value at or above the melting temperature (Tm)

[Formula 1]

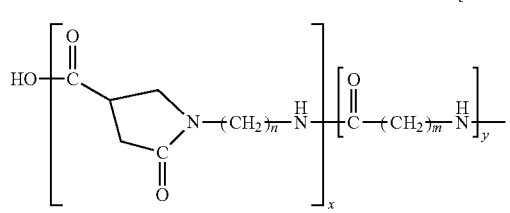

2. The method of claim 1, wherein the amino acid containing the biomass-derived pyrrolidone group is generated by Michael addition reaction and amidation of the itaconic acid and the diamine.

3. The method of claim 2, wherein the diamine comprises 2, 3, 5, 6, 8, 12, or 13 carbon atoms.

4. The method of claim 1, wherein the condensation polymerization reaction includes an amidation between (a) an amine group (—$NH_2$) and carboxylic acid (—COOH) of the amino acid containing the biomass-derived pyrrolidone group and (b) carboxylic acid (—COOH) and an amine group (—$NH_2$) of the α,ω-aliphatic amino acid.

5. A method for preparing a bionylon having triple shape memory effects, the method comprising:
generating amino acid containing a biomass-derived pyrrolidone group by reacting itaconic acid and a diamine; and
generating a nylon copolymer through a condensation polymerization reaction of the amino acid containing the biomass-derived pyrrolidone group and α,ω-aliphatic amino acid;
wherein the condensation polymerization reaction includes an amidation between (a) an amine group (—$NH_2$) and carboxylic acid (—COOH) of the amino acid containing the biomass-derived pyrrolidone group and (b) carboxylic acid (—COOH) and an amine group (—$NH_2$) of the α,ω-aliphatic amino acid;
wherein the amidation generates a water molecule;
wherein the condensation polymerization reaction includes providing the amino acid containing the biomass-derived pyrrolidone group and the α,ω-aliphatic amino acid to a reaction chamber under a nitrogen atmosphere;
wherein a molar content ratio of the amino acid containing the biomass-derived pyrrolidone group to the α,ω-aliphatic amino acid, provided to the reaction chamber, is from 2:8 to 6:4;
wherein the nylon copolymer has both a glass transition temperature (Tg) and a melting temperature (Tm) as phase transition temperatures when a storage modulus is measured according to a temperature change; and
wherein the storage modulus is maintained to have a constant value at or above the melting temperature (Tm).

6. A method for preparing a bionylon having triple shape memory effects, the method comprising:
generating amino acid containing a biomass-derived pyrrolidone group by reacting itaconic acid and a diamine; and
generating a nylon copolymer in a condensation polymerization reaction of the amino acid containing the biomass-derived pyrrolidone group and α,ω-aliphatic amino acid;
wherein the nylon copolymer comprises a melting temperature (Tm) of 101.4° C. to 167.6° C., a glass transition temperature (Tg) of 38.7° C. to 44.4° C., and an intrinsic viscosity of 1.16 ml/g to 1.18 ml/g; and
wherein a molar content ratio of the amino acid containing the biomass-derived pyrrolidone group to the α,ω-aliphatic amino acid, as provided to the condensation polymerization reaction, is from 2:8 to 6:4.

7. The method of claim 5, wherein the generated nylon copolymer has an initial shape at or above the melting temperature, the method further comprising:
applying a first force to the initial shape of the nylon copolymer at or above the melting temperature, the first force causing the nylon polymer to have a first deformed shape;
cooling the nylon copolymer having the first deformed shape to the glass transition temperature;
after the nylon copolymer having the first deformed shape is cooled to the glass transition temperature, removing the first force from the nylon copolymer, wherein the nylon copolymer retains the first deformed shape after removing the first force;
applying a second force to the first deformed shape of the nylon copolymer at the glass transition temperature, the second force causing the nylon polymer to have a second deformed shape;
cooling the nylon copolymer having the second deformed shape to below the glass transition temperature;
after the nylon copolymer having the second deformed shape is cooled to below the glass transition temperature, removing the second force from the nylon copolymer, wherein the nylon copolymer retains the second deformed shape after removing the second force;
restoring the nylon copolymer to the first deformed shape by heating the nylon copolymer to the glass transition temperature; and
restoring the nylon copolymer to the initial shape by heating the nylon copolymer to at or above the melting temperature.

* * * * *